United States Patent [19]

Inoue et al.

[11] Patent Number: 5,186,609
[45] Date of Patent: Feb. 16, 1993

[54] CONTRAROTATING PROPELLER TYPE PROPULSION SYSTEM

[75] Inventors: Kazuo Inoue, Tokyo; Osamu Kubota; Takashi Komura, both of Saitama; Etsuo Noda, Tokyo, all of Japan

[73] Assignee: Honda Giken Kogyo Kabushiki Kaisha, Tokyo, Japan

[21] Appl. No.: 631,669

[22] Filed: Dec. 20, 1990

[51] Int. Cl.⁵ ............................................. B64C 11/48
[52] U.S. Cl. ................................ 416/129; 416/170 R; 416/174
[58] Field of Search ............... 416/128, 129, 120, 122, 416/124, 126, 170 R, 174; 60/39, 162, 268

[56] References Cited

U.S. PATENT DOCUMENTS

| | | | |
|---|---|---|---|
| 2,387,762 | 10/1945 | Leonard | 416/129 |
| 3,942,911 | 3/1976 | Keenan et al. | 416/174 |
| 4,563,129 | 1/1986 | Pagluica | 416/129 |
| 4,693,672 | 9/1987 | Carvalho | 416/174 |
| 4,738,589 | 4/1988 | Wright | 416/129 |
| 4,817,382 | 4/1989 | Rudolph | 60/268 |
| 4,842,484 | 6/1989 | Johnson | 416/129 |
| 4,887,424 | 12/1989 | Geidel et al. | 416/174 |
| 4,936,748 | 6/1990 | Adamson et al. | 416/129 |
| 4,951,461 | 8/1990 | Butler | 416/129 |

FOREIGN PATENT DOCUMENTS

| | | | |
|---|---|---|---|
| 128944 | 11/1946 | Australia | 416/129 |
| 883111 | 6/1943 | France | 416/129 |
| 139598 | 7/1985 | Japan . | |

Primary Examiner—John T. Kwon
Attorney, Agent, or Firm—Lyon & Lyon

[57] ABSTRACT

A contrarotating propeller type propulsion system having first and second output rotary cylinders which are carried individually on an outside support cylinder fixedly secured to a first support structure, the first output rotary cylinder being borne on the outer peripheral surface of the first support cylinder through bearings and the second output rotary cylinder borne on the inner peripheral surface of the first support cylinder through bearings. The first and second output rotary cylinders serve to support the first and second contrarotating propellers, respectively. The first and second output rotary cylinders are supported on the first support cylinder at two axially spaced points. The driving shaft is borne on a second support cylinder fixedly secured to the support structure and surrounded by the first support cylinder. The gear reduction mechanism for causing the counter rotation of the propellers is provided within a case that is cooled and lubricated by oil flowing therethrough and also is cooled by an annular air passage around the entire exterior of the case.

25 Claims, 3 Drawing Sheets

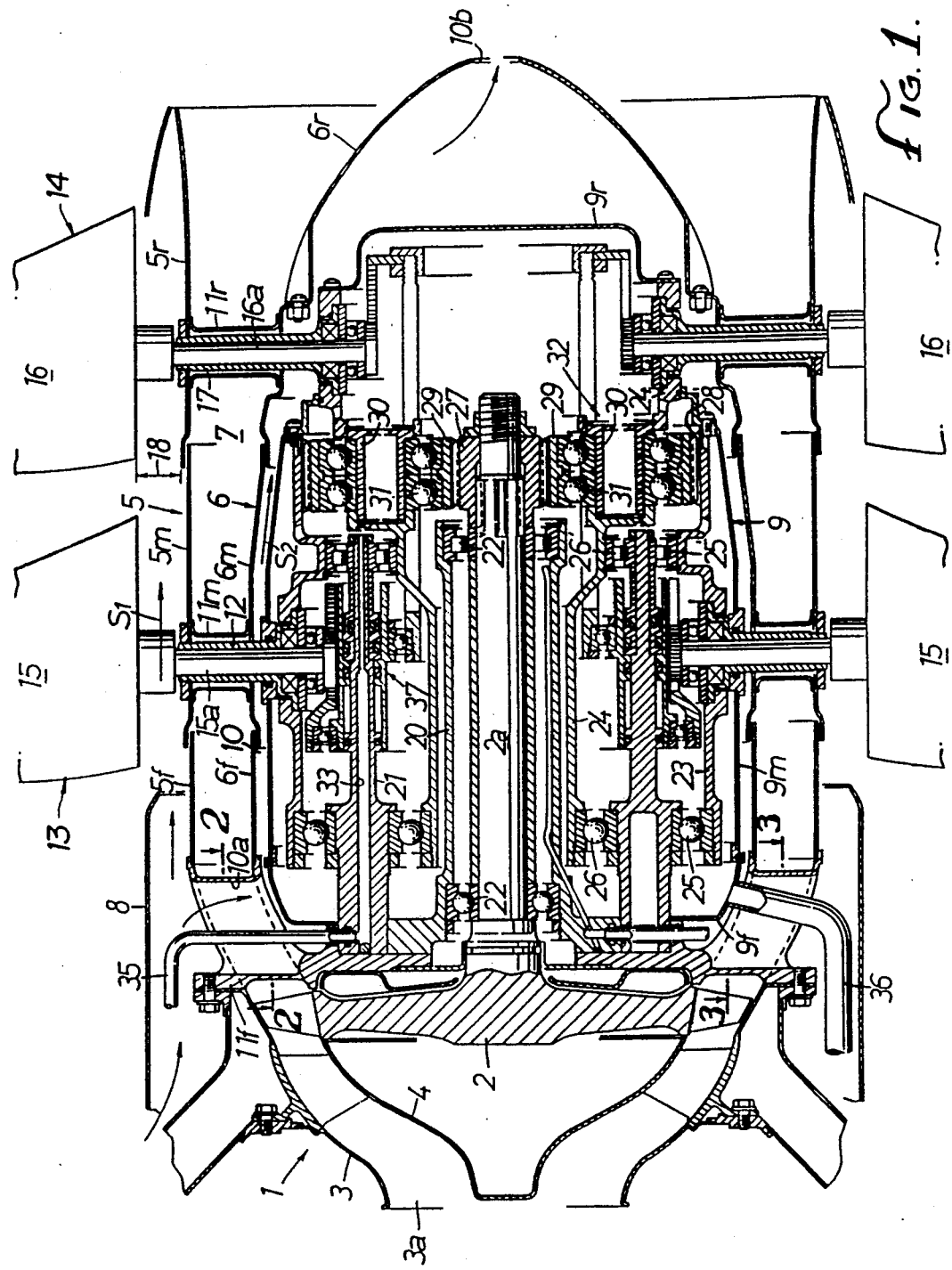

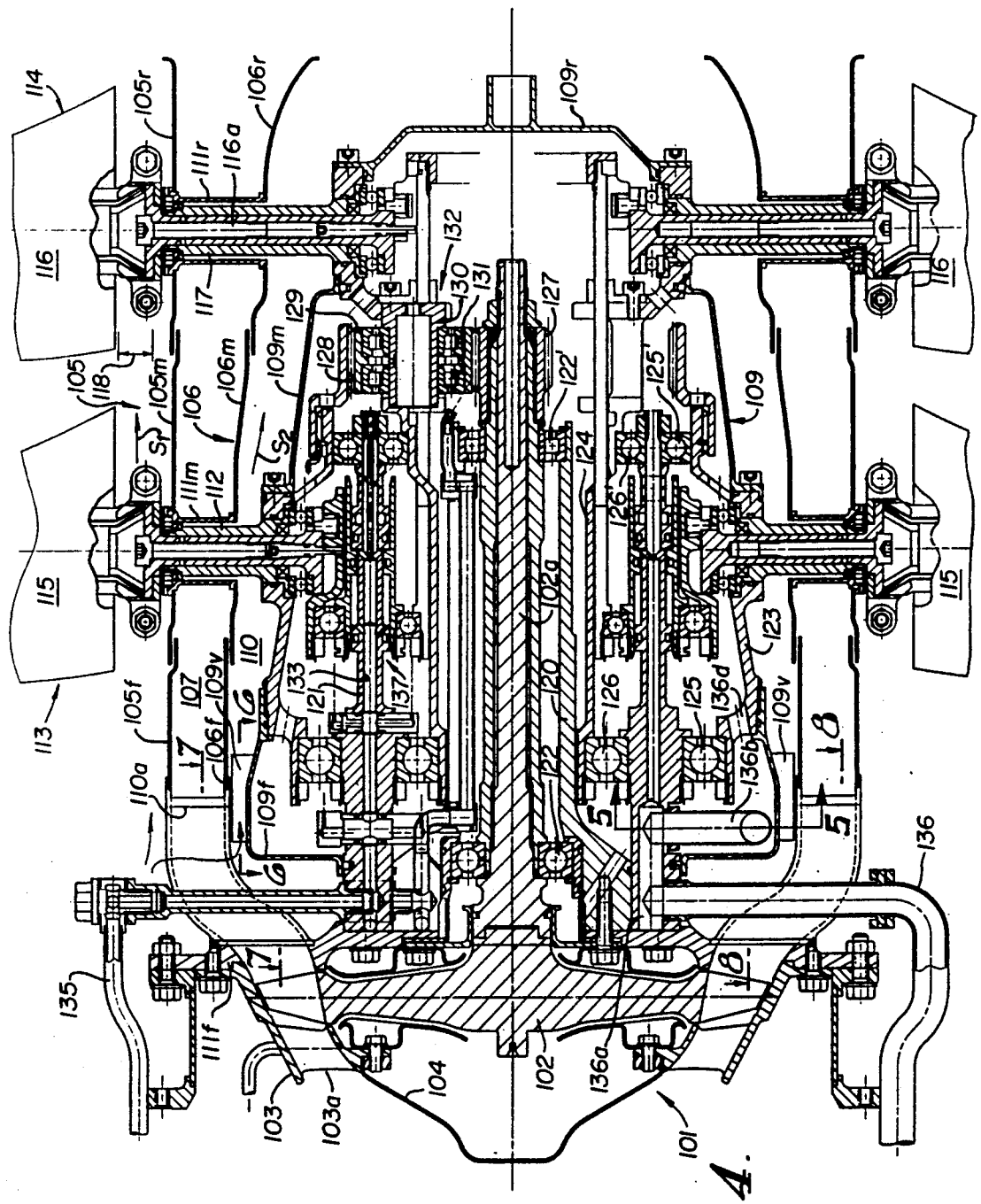

CONTRAROTATING PROPELLER TYPE PROPULSION SYSTEM

BACKGROUND OF THE INVENTION

The present invention relates to a contrarotating propeller type propulsion system used on aircraft particularly concerned with a planetary drive design wherein a planetary gear is interposed between a sun gear fixed to a driving shaft and a ring gear concentrically surrounding and rotating on its axis around the sun gear. A first output rotary cylinder for driving a first propeller is coupled to the ring gear and a second output rotary cylinder for driving a second propeller is coupled to a support shaft for the planetary gear. Such a contrarotating propeller type propulsion system is disclosed in, for example, Japanese Patent Laid-Open No. 139598/1985 and U.S. Pat. Nos. 4,563,129 and 4,842,484.

In the construction of such a propulsion system, usually the output rotary cylinder is supported on a stationary support structure which is used to carry thereon another output rotary cylinder through bearing means. A large relative rotational speed is generated between the first and second output rotary cylinders rotating in opposite directions which affects the bearing means, thus accelerating wear on the bearing means.

Moreover, in a contrarotating propeller type propulsion system of this type in which the driving shaft is driven by a turbine supplied with hot exhaust gases from a gas propulsion apparatus, the hot exhaust gases are circulated in close proximity to the planetary drive system and may further accelerate the wear on the various components.

SUMMARY OF THE INVENTION

In view of the above circumstances, one object of the present invention is to provide a propulsion system of the mentioned type which is compact in construction and capable of prolonging the lifetime of the bearing means carrying the first and second output rotary cylinders.

The present invention relates to a contrarotating propeller type propulsion system characterized first in that first and second output rotary cylinders are carried individually on an outside support cylinder fixedly secured to a support structure, the first output rotary cylinder being borne on the outer peripheral surface of the support cylinder through bearing means and the second output rotary cylinder borne on the inner peripheral surface of the support cylinder through bearing means. By disposing the bearing means inside and outside of the support cylinder, each bearing means will carry only one of the output rotary cylinders corresponding thereto, respectively, so that the relative rotational speed of the elements in each bearing means will never exceed the rotational speed of the corresponding output rotary cylinder, which is effective in enhancing the lifetime thereof. Further, the first and second output rotary cylinders are arranged concentrically with the support cylinder, thus reducing the axial dimension of the system.

In a second feature, each of the first and second output rotary cylinders is supported on the support cylinder at two axially spaced points providing firm and stable support for each output rotary cylinder. Further, each of the two support points for each output rotary cylinder is in radial alignment, i.e. the axial location, with those of the other output rotary cylinder whereby the loads on the support cylinder are aligned.

In a third feature, the driving shaft is borne on a second support cylinder fixedly secured to the support structure and surrounded by the support cylinder. As such the five parts, i.e., first and second output rotary cylinders, first support cylinder for supporting those rotary cylinders, driving shaft and second support cylinder for supporting the shaft are arranged concentrically, thus reducing the axial dimension of the system. Moreover, since the first support cylinder surrounds the second support cylinder, the first support cylinder is formed with a larger diameter than that of the second support cylinder, resulting in high strength of the first support cylinder even with its relatively thin wall thickness. The first support cylinder can thus withstand a heavy load applied from the first and second output rotary cylinders.

In a fourth feature, the invention is characterized in that a cooling air passage surrounds a reduction case having the speed reduction mechanism therein communicates with an outside air intake and an exhaust gas passage of an output turbine surrounds the cooling air passage for inhibiting the transfer of heat from the exhaust gas to the reduction case. Further, a void capable of forming an air stream by using air which has been introduced into the outside air intake is provided between the exhaust gas passage and propeller blades disposed radially outside of the gas passage.

In addition to the fourth feature, the invention is characterized in that a part of the reduction case is constructed into a case rotary part which is rotatable together with the propeller, the case rotary part is reduced in diameter from one end to the other end thereof and that the reduction case is connection with a feed pipe for feeding a lubricating oil into the reduction case and an oil discharge pipe opening to an inner peripheral surface of the case rotary part near its large-diametrical portion for discharging the lubricating oil in the reduction case to the outside for recirculating.

BRIEF DESCRIPTION OF THE DRAWINGS

FIG. 1 is a longitudinally sectional elevation view of a propulsion system for an aircraft;

FIG. 4 is a longitudinally sectional elevation view of an alternate propulsion system for an aircraft;

DETAILED DESCRIPTION OF PREFERRED EMBODIMENTS

The present invention will now be described with reference to the accompanying drawings.

Figure 2:
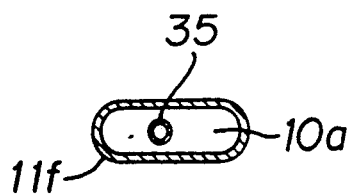
FIG. 2 is a cross-sectional view taken along the line 2—2 in FIG. 1.
Figure 3:
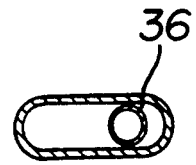
FIG. 3 is a cross-sectional view taken alonq the line 3—3 in FIG. 1.

FIGS. 1-3 illustrate one preferred contrarotating propulsion system according to the present invention. In FIG. 1, The reference numeral 1 denotes an output turbine driven by a gas generator (not shown), comprising a rotor 2, a casing 3 enclosing the rotor 2 therein and having an inlet 3a connected to a gas outlet (not shown) of the gas generator on the front end, and an actuating gas induction member 4 disposed at the inlet 3a of the casing 3.

An outer cylinder 5 is connected to a rear end of the casing 3 an inner cylinder 6 is disposed inside of the outer cylinder 5, and an annular exhaust gas passage 7 extending rearward from the blades of the rotor 2 is defined between the cylinders 5, 6.

An outside air intake cylinder 8 is disposed on the outside of the outer cylinder 5. The outside air intake cylinder 8 is of the type having an inlet opening at the front to receive the outside air into the cylinder as a result of ram pressure generated when aircraft flies and an outlet opening at the rear of the cylinder 8, which opening is directed toward a front propeller 13 positioned rearward thereof.

A reduction case 9 is disposed inside of the inner cylinder 6, and an annular cooling air passage 10 is formed between the inner cylinder 6 and the reduction case 9. Inlet openings 10a (top and bottom openings are shown in FIG. 1) on the front end of the cooling air passage 10 are formed by a hollow portion extending through each front coupling pipe 11f and communicating with the outside air intake cylinder 8. An outlet 10b is formed on the rear end of inner cylinder 6 to moderately throttle the quantity of intake air passing through cooling air passage 10.

The outer cylinder 5 is divided into three parts, namely an outer cylinder front part 5f fixed on the casing 3, an outer cylinder middle part 5m rotatable around the axis of a rotor shaft 2a, and an outer cylinder rear part 5r likewise rotatable around the axis of the rotor shaft 2a.

The inner cylinder 6 is also divided into three parts, that is, an inner cylinder front part 6f coupled to the outer cylinder front part 5f through a plurality of annularly arranged front coupling pipes 11f, an inner cylinder middle part 6m coupled to the outer cylinder middle part 5m through a plurality of annularly arranged middle coupling pipes 11m which are rotatable together with the outer cylinder middle part 5m, and an inner cylinder rear part 6r coupled to the outer cylinder rear part 5r through a plurality of annularly arranged rear coupling pipes 11r which are rotatable together with the outer cylinder rear part 5r.

The reduction case 9 is also divided into three parts, namely a stationary front case part 9f connected to the inner cylinder front part 6f, a middle case part 9m rotatable around the axis of the rotor shaft 2a, and a rear case part 9r which is likewise rotatable around the axis of the rotor shaft 2a.

The front case part 9f has a front end wall and is provided with an inside support cylinder 20 which extends rearward from a central portion of the end wall and an outside support cylinder 21 which extends rearward from the end wall and surrounds the inside support cylinder 20. The rotor shaft 2a passes through the cylinder 20 and is borne rotatably thereon through a pair of front and rear bearings 22, 22'.

An outside output rotary cylinder 23 is borne rotatably on an outer peripheral surface of the outside support cylinder 21 through a pair of front and rear bearings 25, 25', and an inside output rotary cylinder 24 is borne rotatably on an inner peripheral surface of the outside support cylinder 21 through a pair of front and rear bearings 26, 26'.

The outside output rotary cylinder 23 is coupled to the outer cylinder middle part 5m and the middle case part 9m through a plurality of support cylinders 12 passing through hollow portions of the plurality of middle coupling pipes 11m. The support cylinders 12 provide support for a plurality of mounting shafts 15a. A plurality of blades 15, each mounted on its respective mounting shaft 15a, together form a front propeller 13.

The inside output rotary cylinder 24 is coupled to the outer cylinder rear part 5r and the rear case part 9r through a plurality of support cylinders 17 passing through hollow portions of the plurality of rear coupling pipes 11r. The support cylinders 17 provide support for a plurality of mounting shafts 16a. A plurality of blades 16, each mounted on its respective mounting shaft 16a, together form a rear propeller 14.

A void 18 is provided between the blades 15, 16 and the outer cylinder 5 for forming an air stream $S_1$ from the air coming out of a rear end of the outer air intake cylinder 8. Thus, the air stream $S_1$ together with cooling air passage 10 serve to cool both sides, i.e. outside and inside respectively, of the hot gas exhaust passage 7.

A sun gear 27 is fixed on a rear end of the rotor shaft 2a, and a plurality of planetary gears 29 are interposed between the sun gear 27 and a ring gear 28, spaced about the sun gear 27 and surrounding it concentrically. The ring gear 28 is formed on an inner peripheral surface of the outside output rotary cylinder 23, and the planetary gears 29 are borne rotatably on support shafts 30 provided on the inside output rotary cylinder 24 through bearings 31.

Together, the sun gear 27, the planetary gears 29, the ring gear 28 and the output rotary cylinders 23, 24 form a gear reduction mechanism 32 for transmitting and reducing the rate of rotation of the rotor shaft 2a to both propellers 13 and 14 through the output rotary cylinders 23 and 24, respectively.

An oil passage 33, for feeding lubricating oil to the gear reduction mechanism 32, the bearings and other parts, is provided through the circumferential wall of the outside support cylinder 21. As shown in FIGS. 1 and 2, a feed oil pipe 35 passes through the hollow portion of the front coupling pipe 11a and is connected to the oil passage 33. Lubricating oil is fed to the oil passage 33 from an oil pump (not shown) by way of the feed oil pipe 35. As best shown in FIGS. 1 and 3, lubricating oil passing through the reduction case 9 from oil passage 33 is returned to an oil tank (not shown) by way of an oil discharge pipe 36 connected to the front case part 9f and open to an inner bottom surface thereof. The opening of the oil discharge pipe 36 to the front case part 9f is disposed near the front end of the middle case part 9m, and the middle case part 9m and the rear case part 9r are formed to be gradually reduced in diameter in the rearwardly direction whereby the pipe 36 is connected to approximately the lowest portion of case 9.

The outside support cylinder 21 is further provided with a conventional variable pitch mechanism 37 for controlling pitches of the blades 15, 16. The variable pitch mechanism 37 of FIG. 1 is illustrated with a gear drive arrangement, but other type mechanisms may be utilized.

The operation of the embodiment of FIG. 1 will now be described. When an actuating gas is fed to the inlet 3a of the output turbine 1 from a gas generator (not shown), the actuating gas drives the rotor 2 and then flows rearwardly and outwardly to the exhaust gas passage 7. Upon rotation of the rotor 2 to which the rotor shaft 2a is connected, the sun gear 27 also rotates to drive the planetary gears 29. As a result, the ring gear 28, along with the outside output rotary cylinder 23, is rotated and driven in one direction by rotation of the planetary gears 29, and the support shafts 30, along with the inside output rotary cylinder 24, are rotated and driven in the other direction through revolution of the gears 29. Therefore, the front and rear propellers 13 and 14 rotate in opposite directions with respect to each other to generate a propulsion force.

During this operation, the middle case part 9m coupled to the outside output rotary cylinder 23, the inner cylinder middle part 6m, and the outer cylinder middle part 5m rotate together with the front propeller 13, whereas the rear case part 9r coupled to the inside output rotary cylinder 24, the inner cylinder rear part 6r, and the outer cylinder rear part 5r rotate together with the rear propeller 14.

Since the output rotary cylinders 23 and 24, which rotate in the opposite directions, are supported separately on the outer and inner peripheral surfaces of the outside support cylinder 21 through the separate pairs of bearings 25, 25′ and 26, 26′, respectively, even when both the output rotary cylinders 23 and 24 are rotating relatively to each other at high speed, it is assured that the rotational speed of each of the bearings 26, 26′ and 25, 26′ is not allowed to exceed that of the corresponding output rotary cylinder 23 or 24, thus minimizing the stresses on the elements and prolonging the lifetimes thereof. In addition, since each of the output rotary cylinders 23 and 24 is supported at a pair of longitudinally spaced points by a pair of bearings 25, 25′ or 26, 26′, they are firmly supported in a stabilized manner.

Moreover, since the rotor shaft 2a which is subjected to a relatively low load is supported by the small-diameter inside support cylinder 20 and the inside and outside output rotary cylinders 24 and 23 which are subjected to relatively high load are supported by the large-diameter outside support cylinder 21, the strength of each support cylinder 20, 21 and the load to be supported thereby are matched to each other, thus simultaneously achieving both a lightweight construction and enhanced durability.

In addition, the rotor shaft 2a, the inside and outside support cylinders 20, 21 and the inside and outside output rotary cylinders 24, 23 are disposed concentrically with respect to each other, resulting in considerable reduction of the axial dimension of the whole system.

During operation, lubricating oil fed from the feed oil pipe 35 to the oil passage 33 lubricates the gear reduction mechanism 32, the various bearings other parts and then drops into the bottom portion of the reduction case 9. Since the middle case part 9m and the rear case part 9r are reduced in diameter rearwardly and perform rotating movements as described above, the lubricating oil is moved to the large-diametrical side of the case 9 while being kept in strong contact with the inside surfaces of the middle case part 9m and the rear case part 9r by the action of centrifugal force, and the oil is then returned to an oil tank (not shown) through the oil discharge pipe 36. Thus the lubricating oil flowing inside of the middle case part 9m and the rear case part 9r effectively cools down the reduction case 9 which tends to be heated by radiant heat from the exhaust gas passage 7 and the like, thereby preventing the gear reduction mechanism 32 from being overheated.

When air is forced into the outside air intake cylinder 8 by ram pressure during flight of the aircraft, part of the air flows out the rear end of the outside air intake cylinder 8 to form an air current $S_1$ flowing rearward along the outer cylinder 5, that is, along the outer peripheral wall of the exhaust gas passage 7. The air current $S_1$ cools down the outer cylinder 5 and the space defined between the outer cylinder 5 and the blades 15, 16 is thermally insulated, thereby reducing the influence of heat from the exhaust gas passage 7 on the blades 15, 16.

Meanwhile, part of the air in the outside air intake cylinder 8 flows into the cooling air passage 10 from the hollow portions of the front coupling pipes 11f forming the inlets 10a and flows out of the outlet 10b, thereby forming an air stream $S_2$ in the cooling air passage 10, so that the inner cylinder 6r that is, the inner peripheral wall of the exhaust gas passage 7 and the reduction case 9 are cooled. The space between the inner cylinder 6 and the reduction case 9 is thereby insulated from heat and the influence of heat from the exhaust gas passage 7 on the gear reduction mechanism 32 can be reduced.

An alternate embodiment is shown in FIGS. 4-8 and many of the components are substantially the same and/or have substantially the same function as components of the first embodiment and will be given the same numerals in the "100" series for ease of identification. To the extent a component is identical and has identical functions as a component in the first embodiment, it may not be described in detail. Referring to FIG. 4, a gas generator (not shown) drives an output turbine 101 comprised of a rotor 102, a casing 103 enclosing the rotor 102 therein and having an inlet 103a connected to a gas outlet (not shown) of the gas generator on the front end, and an actuating gas induction member 104 disposed at the inlet 103a of the casing 103.

An outer cylinder 105 is connected to a rear end of the casing 103, an inner cylinder 106 is disposed inside of the outer cylinder 105, and an annular exhaust gas passage 107 extending rearward from the blades of the rotor 102 is defined between the cylinders 105, 106.

A reduction case 109 is disposed inside of the inner cylinder 106, and an annular cooling air passage 110 is formed between the inner cylinder 106 and the reduction case 109. Inlet openings 110a on the front end of the cooling air passage 110 are formed by a hollow portion extending through each front coupling pipe 111f and communicate with the outside for providing fresh air. An outside air intake cylinder similar to cylinder 8 of the first embodiment may be provided. Vanes 109v are provided to cause a circumferential motion to the air flow, the air flow stream designated as $S_2$. An outlet 10b is formed on the rear end in inner cylinder 106 to moderately throttle the quantity of intake air passing through cooling air passage 110.

The outer cylinder 105 is divided into three parts, namely an outer cylinder front part 105f fixed on the casing 103, an outer cylinder middle part 105m rotatable around the axis of a rotor shaft 102a, and an outer cylinder rear part 105r likewise rotatable around the axis of the rotor shaft 102a.

The inner cylinder 106 is also divided into three parts, that is, an inner cylinder front part 106f coupled to the outer cylinder front part 105f through a plurality of annularly arranged front coupling pipes 111f, an inner cylinder middle part 106m coupled to the outer cylinder middle part 105m through a plurality of annularly arranged middle coupling pipes 111m which are rotatable together with the outer cylinder middle part 105m, and an inner cylinder rear part 106r coupled to the outer cylinder rear part 105r through a plurality of annularly arranged rear coupling pipes 111r which are rotatable together with the outer cylinder rear part 105r.

The reduction case 109 is also divided into three parts, namely a front case part 109f connected to an outside support cylinder 123 and rotatable around rotor shaft 102a, a middle case part 109m rotatable around the axis of the rotor shaft 102a, and a rear case part 109r which is likewise rotatable around the axis of the rotor shaft 102a.

The front case part 109f has a front end wall which abuts an inside support cylinder 120. The inside support cylinder 120 and an outside support cylinder 121 extend rearward from the end wall and surround the inside support cylinder 120. The rotor shaft 102a passes through the cylinder 120 and is borne rotatably thereon through a pair of front and rear bearings 122, 122'.

An outside output rotary cylinder 123 is borne rotatably on an outer peripheral surface of the outside support cylinder 121 through a pair of front and rear bearings 125, 125', and an inside output rotary cylinder 124 is borne rotatably on an inner peripheral surface of the outside support cylinder 121 through a pair of front and rear bearings 126, 126'.

The outside output rotary cylinder 123 is coupled to the outer cylinder middle part 105m and the middle case part 109m through a plurality of support cylinders 112 passing through hollow portions of the plurality of middle coupling pipes 111m. The support cylinders 112 provide support for a plurality of mounting shafts 115a. A plurality of blades 115, each mounted on its respective mounting shaft 115a, together form a front propeller 113.

The inside output rotary cylinder 124 is coupled to the outer cylinder rear part 105r and the rear case part 109r through a plurality of support cylinders 117 passing through hollow portions of the plurality of rear coupling pipes 111r. The support cylinders 117 provide support for a plurality of mounting shafts 116a. A plurality of blades 116, each mounted on its respective mounting shaft 116a, together form a rear propeller 114.

A void 118 is provided between the blades 115, 116 and the outer cylinder 105 for forming an air stream $S_1$ along an outer surface of outer cylinder 105.

A sun gear 127 is fixed on a rear end of the rotor shaft 102a, and a plurality of planetary gears 129 are interposed between the sun gear 127 and a ring gear 128, spaced about the sun gear 127 and surrounding it concentrically. The ring gear 128 is formed on an inner peripheral surface of the outside output rotary cylinder 123, and the planetary gears 129 are borne rotatably on support shafts 130 provided on the inside output rotary cylinder 124 through bearings 131.

Together, the sun gear 127, the planetary gears 129, the ring gear 128 and the output rotary cylinders 123, 124 form a gear reduction mechanism 132 for transmitting and reducing the rate of rotation of the rotor shaft 102a to both propellers 113 and 114.

Figure 7:
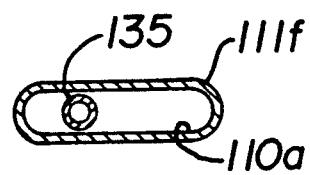
FIG. 7 is a cross-sectional view taken along the line 7—7 in FIG. 4.

An oil passage 133 for feeding lubricating oil to the gear reduction mechanism 132, the bearings and other parts is provided through the circumferential wall of the outside support cylinder 121. As best shown in FIGS. 4 and 7, a feed oil pipe 135 passing through the hollow portion of the front coupling pipe 111a is connected to the oil passage 133. Lubricating oil is fed to the oil passage 133 from an oil pump (not shown) by way of the feed oil pipe 135. The lubricating oil is supplied from the oil passage 133 directly to the various components requiring lubrication, such as the bearings and gears, through branch passages (unnumbered) and tubes (unnumbered) as shown in FIG. 4.

Figure 5:
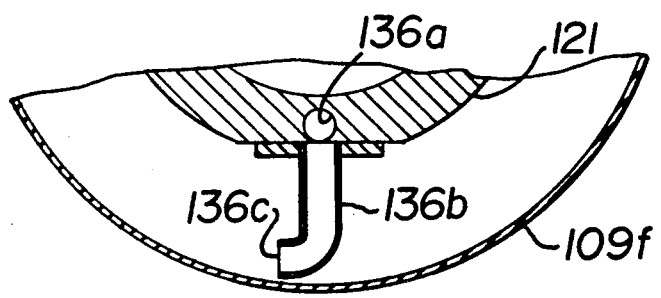
FIG. 5 is a cross-sectional view taken along the line 5—5 in FIG. 4.
Figure 6:
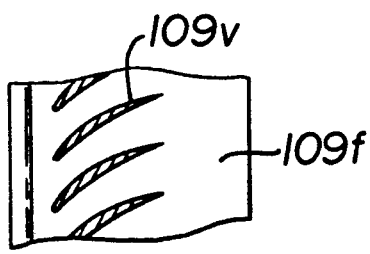
FIG. 6 is a cross-sectional view taken along the line 6—6 in FIG. 4.
Figure 8:
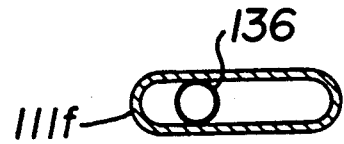
FIG. 8 is a cross-sectional view taken along the line 8—8 in FIG. 4.

As best shown in FIGS. 4, 5 and 8, lubricating oil passing through the reduction case 109 is returned to an oil tank (not shown) by way of an oil discharge pipe 136 connected to the outside support cylinder 121 in front of front case part 109f and into an oil passage 136a which extends rearwardly in the outside support cylinder 121. An oil pick-up tube 136 is mounted on the outside support cylinder 121 in communication with the oil passage 136a and extends downwardly to near the bottom of the inside of front case part 109f. The lower end of oil pick-up tube 136b has a 90° bend to cause the open end 136c to face in the circumferential direction confronting the direction of rotation of middle case part 109m. Oil is discharged from middle case part 109m through holes 136d and naturally imparts a circumferential motion to the oil which assists the pick-up of the oil through the open end 136c of pick-up tube 136b. The open end 136c of the oil pick-up tube 136b is disposed near the front end of the front case part 109f, and the front case part 109f, the middle case part 109m and the rear case part 109r are formed to be gradually reduced in diameter in the rearward direction to cause all of the oil to migrate toward the pick-up tube 136b.

This embodiment illustrates the outside support cylinder 121 being provided with a variable pitch mechanism 137 of a slot and pin type mechanism for controlling pitches of the blades 115, 116 but any other type mechanism may be used.

In most respects, except as described above, the operation of the embodiment of FIGS. 4–8 is essentially the same as the operation of the embodiment of FIG. 1 described above and will not be repeated.

ADVANTAGES OF THE INVENTION

Certain of the advantages of the present invention will now be described. As described above, according to the first feature of the invention, the first and second output rotary cylinders are carried individually on an outside support cylinder provided on support structure, the first output rotary cylinder being borne on the outer peripheral surface of the support cylinder through bearing means and the second output rotary cylinder borne on the inner peripheral surface of the support cylinder through bearing means. By this arrangement, each bearing means avoids excessive increase in its rotational speed thereby prolonging its lifetime. Further, the support cylinder and the first and second output rotary cylinders are disposed concentrically so that the axial dimension of the system is reduced thereby contributing to a compact construction of the system.

According to the second feature of the invention, each output rotary cylinder is supported at two axially spaced points by the support cylinder. Support for each output rotary cylinder can be stabilized and its durability can be enhanced.

Further according to the third feature of the invention, the driving shaft is borne on the second support cylinder which is fixedly secured to the support structure and is surrounded by the support cylinder resulting in a concentric disposition of the five parts, i.e., the first support cylinder, first and second output rotary cylinders, second support cylinder and the driving shaft. Such concentric disposition of these components may lead to a further compact construction of the system. In addition, the large-diametrical second support cylinder surrounding the first support cylinder can have a satisfactory strength despite being formed relatively thin, so that the second support cylinder can withstand a high load applied from the first and second output rotary cylinders, thus serving to enhance the durability as well as to provide a lightweight construction.

Still further, according to a fourth feature, a cooling air passage surrounds the reduction case for separating the reduction case from the heat of the exhaust gas passage and maintaining the reduction case at an acceptable temperature.

What is claimed is:

1. A contrarotating propeller type propulsion system wherein a planetary gear is interposed between a sun gear fixed to a driving shaft and a ring gear concentrically surrounding the sun gear for rotation of the planetary gear on its axis and revolution around the sun gear, characterized in that a first output rotary cylinder for driving a first propeller is coupled to the ring gear, and a second output rotary cylinder for driving a second propeller is coupled to a support shaft for the planetary gear, the first output rotary cylinder is borne on an outer peripheral surface of a first support cylinder fixedly secured to a support structure through bearing means, and the second output rotary cylinder is borne on the inner peripheral surface of said first support cylinder through separate bearing means.

2. A system as defined in claim 1, wherein said first and second output rotary cylinders are arranged concentrically with said first support cylinder.

3. A system as defined in claim 1, wherein each of said first and second output rotary cylinders is supported on the first support cylinder at two axially spaced points.

4. A system as defined in claim 3, wherein said two axially spaced points, which support said first and second output rotary cylinders, are in radially alignment.

5. A system as defined in claim 1, wherein said driving shaft is borne on a second support cylinder which is fixedly secured to the support structure and is surrounded by said first support cylinder.

6. A system as defined in claim 1 further comprising means for preventing overheating of the propulsion system including
   (a) an inner cylinder disposed inside an outer cylinder forming an annular exhaust passage therebetween;
   (b) a reduction case disposed inside the inner cylinder forming an annular cooling passage therebetween.

7. A system as defined in claim 4 wherein the means for preventing overheating of the propulsion system further includes (c) means for directing air through air inlets into the annular cooling air passage and (d) means for directing working gas driving the rotor through the annular exhaust passage.

8. A system as defined in claim 6 further comprising means for reducing influence of heat from the exhaust passage on the blades comprising means for directing an air current along an outside surface of the outer cylinder.

9. A system as defined in claim 6 further comprising an air intake cylinder disposed outside the outer cylinder, the air intake cylinder constructed and arranged to direct air, which is forced thereinto by ram pressure during flight, into the annular cooling air passage and along an outside surface of the outer cylinder.

10. A system as defined in claim 6 wherein the means for preventing overheating further includes a lubricating oil system which circulates oil through the reduction case.

11. A system as defined in claim 10 wherein the oil lubrication system includes an oil discharge outlet positioned toward one end of the reduction case, said reduction case increasing in diameter towards the oil discharge outlet.

12. A contrarotating propeller type propulsion system for driving first and second propellers, comprising
    a driving shaft connectable to a rotor;
    a sun gear fixed to the driving shaft;
    a ring gear concentrically surrounding the sun gear;
    a plurality of planetary gears interposed between the sun gear and the ring gear concentrically surrounding the sun gear;
    a plurality of support shafts, each support shaft supporting a respective planetary gear, each planetary gear rotating on its respective support shaft and revolving around the sun gear;
    a first output rotary cylinder for driving a first propeller coupled to the ring gear; and
    a second output rotary cylinder for driving a second propeller coupled to a support shaft for the planetary gear,
    wherein the first and second output rotary cylinders are carried individually on a first support cylinder fixedly secured to a support structure, the first output rotary cylinder being borne on the outer peripheral surface of the first support cylinder through bearing means and the second output rotary cylinder is borne on the inner peripheral surface of the first support cylinder through bearing means.

13. A system as defined in claim 12, wherein said first and second output rotary cylinders are arranged concentrically with said first support cylinder.

14. A system as defined in claim 12, wherein each of said first and second output rotary cylinders is supported on the first support cylinder at two axially spaced points.

15. A system as defined in claim 14, wherein said two axially spaced points, which support said first and second output rotary cylinders, are in radially alignment.

16. A system as defined in claim 12, wherein said driving shaft is borne on a second support cylinder which is fixedly secured to the support structure and is surrounded by said first support cylinder.

17. A system as defined in claim 12 further comprising means for preventing overheating of the propulsion system including
    (a) an inner cylinder disposed inside an outer cylinder forming an annular exhaust passage therebetween;
    (b) a reduction case disposed inside the inner cylinder forming an annular cooling passage therebetween.

18. A system as defined in claim 17 wherein the means for preventing overheating of the propulsion system further includes (c) means for directing air through air inlets into the annular cooling air passage and (d) means for directing working gas driving the rotor through the annular exhaust passage.

19. A system as defined in claim 17 further comprising means for reducing influence of heat from the exhaust passage on the blades comprising means for directing an air current along an outside surface of the outer cylinder.

20. A contrarotating propeller type propulsion system for driving first and second propellers, comprising
    a gear drive system including a drive shaft operably connected to the rotor for driving first and second propellers, the gear drive system disposed within a reduction case;

means for preventing overheating of the propulsion system including (a) an inner cylinder disposed inside an outer cylinder forming an annular exhaust passage therebetween, (b) a reduction case disposed inside the inner cylinder forming an annular cooling passage therebetween, and (c) inlet passage means extending radially inward through the outer cylinder, through the annular exhaust passage, and through the inner cylinder for providing passage of outside air through the annular exhaust passage into the annular cooling passage.

21. A system as defined in claim 20 wherein the means for preventing overheating of the propulsion system further includes (d) means for directing working gas driving the rotor through the annular exhaust passage.

22. A system as defined in claim 20 wherein the means for preventing overheating further includes a lubricating oil system which circulates oil through the reduction case.

23. A contrarotating propeller type propulsion system for driving first and second propellers, comprising a gear drive system including a drive shaft operably connected to the rotor for driving first and second propellers, the gear drive system disposed within a reduction case; and means for preventing overheating of the propulsion system including (a) an inner cylinder disposed inside an outer cylinder forming an annular exhaust passage therebetween, (b) a reduction case disposed inside the inner cylinder forming an annular cooling passage therebetween, (c) inlet passage means extending radially inward through the annular exhaust passage for providing passage of outside air through the annular exhaust passage into the annular cooling passage, and (d) a lubricating oil system which circulates oil through the reduction case, wherein the lubricating oil system includes an oil discharge outlet positioned toward one end of the reduction case, said reduction case increasing in diameter towards the oil discharge outlet.

24. A system as defined in claim 20 further comprising means for reducing influence of heat from the exhaust passage on the blades comprising a separate air intake cylinder positioned outside of the outer cylinder, the separate air intake cylinder directing an air current along an outside surface of the outer cylinder.

25. A contrarotating propeller type propulsion system for driving first and second propellers, comprising a gear drive system including a drive shaft operably connected to the rotor for driving first and second propellers, the gear drive system disposed within a reduction case; and means for preventing overheating of the propulsion system including (a) an inner cylinder disposed inside an outer cylinder forming an annular exhaust passage therebetween, (b) a reduction case disposed inside the inner cylinder forming an annular cooling passage therebetween, and (c) a lubricating oil system which circulates oil through the reduction case by the rotating action of the reduction case, wherein the lubricating oil system includes an oil discharge outlet positioned toward one end of the reduction case, said reduction case increasing in diameter towards the oil discharge outlet.

* * * * *